US008944357B2

(12) United States Patent
Conti et al.

(10) Patent No.: US 8,944,357 B2
(45) Date of Patent: Feb. 3, 2015

(54) MULTIFUNCTIONAL FOOD PROCESSING TOOL FOR USE WITH A FOOD PROCESSING DEVICE

(71) Applicant: Whirlpool Corporation, Benton Harbor, MI (US)

(72) Inventors: Michael P. Conti, St. Joseph, MI (US); David J. Gushwa, Mishawaka, IN (US); Mitchell L. Robertson, Elkhart, IN (US)

(73) Assignee: Whirlpool Corporation, Benton Harbor, MI (US)

( * ) Notice: Subject to any disclaimer, the term of this patent is extended or adjusted under 35 U.S.C. 154(b) by 237 days.

(21) Appl. No.: 13/663,520

(22) Filed: Oct. 30, 2012

(65) Prior Publication Data

US 2014/0117130 A1 May 1, 2014

(51) Int. Cl.
*A47J 43/046* (2006.01)

(52) U.S. Cl.
USPC .......................................... 241/282.2; 99/537

(58) Field of Classification Search
CPC ......... A47J 43/04; A47J 43/08; A47J 43/046; A47J 43/06; A47J 43/0722; B02C 18/12; B02C 18/186
USPC ....................... 241/282.1, 282.2; 99/510, 537
See application file for complete search history.

(56) References Cited

U.S. PATENT DOCUMENTS 1,854,761 A 4/1932 Perkins
2,189,199 A 2/1940 Criner
2,905,398 A 9/1959 Deangelis et al.
3,156,278 A 11/1964 Otto
3,199,860 A 8/1965 Frank
3,322,401 A 5/1967 Mersch
3,623,525 A 11/1971 Kieves
3,692,427 A 9/1972 Risse
3,784,118 A 1/1974 Hurwitz
4,190,208 A 2/1980 Schaeffer et al.
4,283,979 A 8/1981 Rakocy
4,364,525 A 12/1982 McClean
4,560,111 A 12/1985 Cavalli
4,818,116 A 4/1989 Pardo
4,877,191 A 10/1989 Golob et al.
5,009,510 A 4/1991 Gabriele
5,046,252 A 9/1991 Ayuta et al.
5,470,202 A 11/1995 Lemont (Continued)

FOREIGN PATENT DOCUMENTS

CN 201101452 Y 8/2008
CN 101496699 A 8/2009

(Continued)

OTHER PUBLICATIONS

European Patent Application No. 13185010.9, filed Sep. 18, 2013, Applicant: Whirlpool Corporation, European Search Report re: Same, mail date: Mar. 21, 2014.

*Primary Examiner* — Mark Rosenbaum

(57) ABSTRACT

A food processing device including a base having a motor positioned therein, a removable bowl coupled to the base, and a removable lid coupled to the bowl so as to define a processing chamber. The food processing device includes a multi-functional food processing tool that is positioned in the processing chamber and driven by the motor. The food processing tool includes a pair of adjustable blades. The food processing device includes an adjustment assembly operable to change the pitch of the adjustable blades while the food processing tool is driven by the motor.

20 Claims, 6 Drawing Sheets

(56) References Cited

U.S. PATENT DOCUMENTS

| | | | | |
|---|---|---|---|---|
| 5,782,416 | A * | 7/1998 | Nejatbina | 241/194 |
| 5,836,688 | A | 11/1998 | Eping | |
| 6,092,922 | A | 7/2000 | Kett et al. | |
| 6,315,226 | B1 | 11/2001 | Trick et al. | |
| 6,550,703 | B2 | 4/2003 | Williams et al. | |
| 7,322,112 | B2 | 1/2008 | Boerner | |
| 7,328,864 | B2 | 2/2008 | Narai et al. | |
| 7,552,885 | B2 | 6/2009 | Katz et al. | |
| 8,444,076 | B2 | 5/2013 | Rukavina | |
| 2006/0163396 | A1 | 7/2006 | Kennedy et al. | |
| 2007/0209528 | A1 | 9/2007 | Chang | |
| 2008/0115677 | A1 | 5/2008 | Tseng et al. | |
| 2008/0156913 | A1 | 7/2008 | Orent | |
| 2008/0163768 | A1 | 7/2008 | Glucksman et al. | |
| 2009/0139383 | A1 | 6/2009 | Tsai | |
| 2009/0158941 | A1 | 6/2009 | Lee | |
| 2009/0314168 | A1 | 12/2009 | Krasznai | |
| 2011/0139017 | A1 | 6/2011 | Beber et al. | |
| 2011/0265664 | A1 | 11/2011 | Goncalves et al. | |
| 2011/0265666 | A1 | 11/2011 | Beber et al. | |
| 2013/0240654 | A1 | 9/2013 | Rukavina | |

FOREIGN PATENT DOCUMENTS

| | | | |
|---|---|---|---|
| DE | 3644267 | A1 | 7/1988 |
| EP | 100755 | A2 | 2/1984 |
| FR | 2418672 | A | 9/1979 |
| FR | 2582497 | A1 | 12/1986 |
| FR | 2862199 | A1 | 5/2005 |
| GB | 2214444 | A | 9/1989 |
| WO | 0221986 | A1 | 3/2002 |
| WO | 03057355 | A1 | 7/2003 |
| WO | 2009076585 | A1 | 6/2009 |
| WO | 2012113106 | A1 | 8/2012 |
| WO | 2012113125 | A1 | 8/2012 |

* cited by examiner

MULTIFUNCTIONAL FOOD PROCESSING TOOL FOR USE WITH A FOOD PROCESSING DEVICE

TECHNICAL FIELD

The present disclosure relates generally to a domestic food processing device, and, more particularly, to an adjustable food processing assembly for a food processing device.

BACKGROUND

A food processing device is a motorized domestic appliance for manipulating (e.g., chopping, slicing, dicing, shredding, grating, stirring, whipping, or blending) food items. Such an appliance includes a bowl with a removable lid. Food items are inserted into the bowl through a feed tube formed in the lid where they are cut by motor-driven cutting tool and collect in the bottom of the bowl. Some food processors also include an outlet on the bowl that guides the processed pieces of food into an outside bin, container, or other bowl.

Food processors typically come equipped with a number of interchangeable processing tools for slicing, shredding, mixing, or other food processing operations. One common cutting tool is a slicing blade or pair of slicing blades that rotate about an axis to process food items placed in the bowl. One common mixing tool is a stirring or mixing beater that includes one or more mixing elements to churn the food items within the bowl.

SUMMARY

According to one aspect of the disclosure, a food processing device is disclosed. The food processing device includes a base having a motor positioned therein, a removable bowl coupled to the base, and a removable lid coupled to the bowl so as to define a processing chamber. The lid has a feed tube that opens into the bowl. The food processing device includes a food processing tool positioned in the processing chamber and driven by the motor to rotate about a central axis. The food processing tool includes a hub that defines the central axis and a pair of adjustable blades extending outwardly from the hub. Each adjustable blade has a cutting edge formed thereon. The food processing device also includes an adjustment assembly including a lever extending outwardly from the base. The lever is moveable relative to the base and operable to pivot each adjustable blade while the food processing tool is rotated about the central axis between a plurality of positions including a first position in which each adjustable blade extends substantially parallel to a bottom surface of the removable bowl, and a second position in which each adjustable blade extends substantially orthogonal to the bottom surface of the removable bowl.

In some embodiments, the food processing tool may include a shaft that is positioned in the hub and is coupled to the adjustable blades. The shaft may be movable vertically relative to the hub between a raised position in which the adjustable blades are in the first position and a lowered position in which the adjustable blades are in the second position.

In some embodiments, the adjustment assembly may further include an adaptor having an upper end coupled to the shaft of the food processing tool and a lower end coupled to the base. Movement of the lever relative to the base may cause vertical movement of the adaptor and the shaft of the food processing tool.

In some embodiments, the adaptor may include an upper plate coupled to the food processing tool and a lower sleeve pivotally coupled to the base. Additionally, in some embodiments, the upper plate may include a first plurality of teeth, and the lower sleeve may have a second plurality of teeth formed thereon. The second plurality of teeth may be interdigitated with the first plurality of teeth.

In some embodiments, movement of the lever in a first direction relative to the base may cause the adaptor to move downward and the shaft to move from the raised position to the lowered position. Movement of the lever in a second direction opposite the first direction may cause the adaptor to move upward and the shaft to move from the lowered position to the raised position.

In some embodiments, the shaft may be biased in the lowered position. Additionally, in some embodiments, the hub of the food processing tool may be in a fixed vertical position relative to the base.

In some embodiments, the removable bowl may have a central tube extending upwardly from the bottom surface, and the hub of the food processing tool may be coupled to an upper end of the central tube.

According to another aspect, a food processing device includes a base having a motor positioned therein, a removable bowl coupled to the base, and a removable lid coupled to the bowl so as to define a processing chamber. The lid has a feed tube that opens into the bowl. The food processing device includes a food processing tool that is positioned in the processing chamber and driven by the motor to rotate about a central axis. The food processing tool includes a hub that defines the central axis and at least one adjustable blade extending outwardly from the hub. The adjustable blade is configured to rotate about a pivot axis extending through the hub orthogonal to the central axis. The food processing device also includes an adjustment assembly operable to cause the adjustable blade to rotate about the pivot axis while the food processing tool is driven by the motor.

In some embodiments, the adjustment assembly may include an adaptor having an upper end coupled to the food processing tool and a lower end coupled to the base. In some embodiments, the removable bowl may have a central tube extending upwardly from a bottom surface thereof, the adaptor may be positioned in the central tube of the bowl, and the hub of the food processing tool may be coupled to an upper end of the central tube.

In some embodiments, the adjustable blade may be configured to rotate between a first position in which the cutting edge of the adjustable blade extends substantially horizontally, and a second position in which the cutting edge extends substantially vertically.

According to another aspect, a food processing tool for a domestic food processing device is disclosed. The food processing tool includes a hub including a socket sized to receive an output shaft of the food processing device. The hub defines a central rotation axis of the food processing tool. The food processing tool also includes a shaft movably coupled to the hub and configured to move vertically along the central rotation axis. The food processing tool includes a pair of adjustable blades extending outwardly from the hub. Each blade has a cutting edge formed thereon, and each adjustable blade is pivotally coupled to the shaft such that vertical movement of the shaft causes the adjustable blades to pivot about an axis extending orthogonal to the central rotation axis.

In some embodiments, the food processing tool may also include an adaptor having an upper end coupled to the shaft and a lower end having a plurality of teeth formed thereon. In some embodiments, each adjustable blade may be configured to pivot between a first position in which the cutting edge extends horizontally, and a second position in which the cutting edge extends vertically. In some embodiments, the adjustable blades may be biased in the second position.

In some embodiments, each adjustable blade may include a cylindrical base that defines the axis, and a pin extending outwardly from the cylindrical base. The pin may be offset from the axis and received in an opening defined in the shaft.

In some embodiments, the food processing tool may further include a hollow tube secured to the hub. The cylindrical bases of the adjustable blades may be positioned at opposite ends of the hollow tube. An upper end of the shaft may extend through a slot defined in the hollow tube.

In some embodiments, the food processing tool may include a spring positioned between the upper end of the shaft and an inner wall of the hub.

BRIEF DESCRIPTION OF THE DRAWINGS

The detailed description particularly refers to the following figures, in which.

DETAILED DESCRIPTION OF THE DRAWINGS

Figure 1:
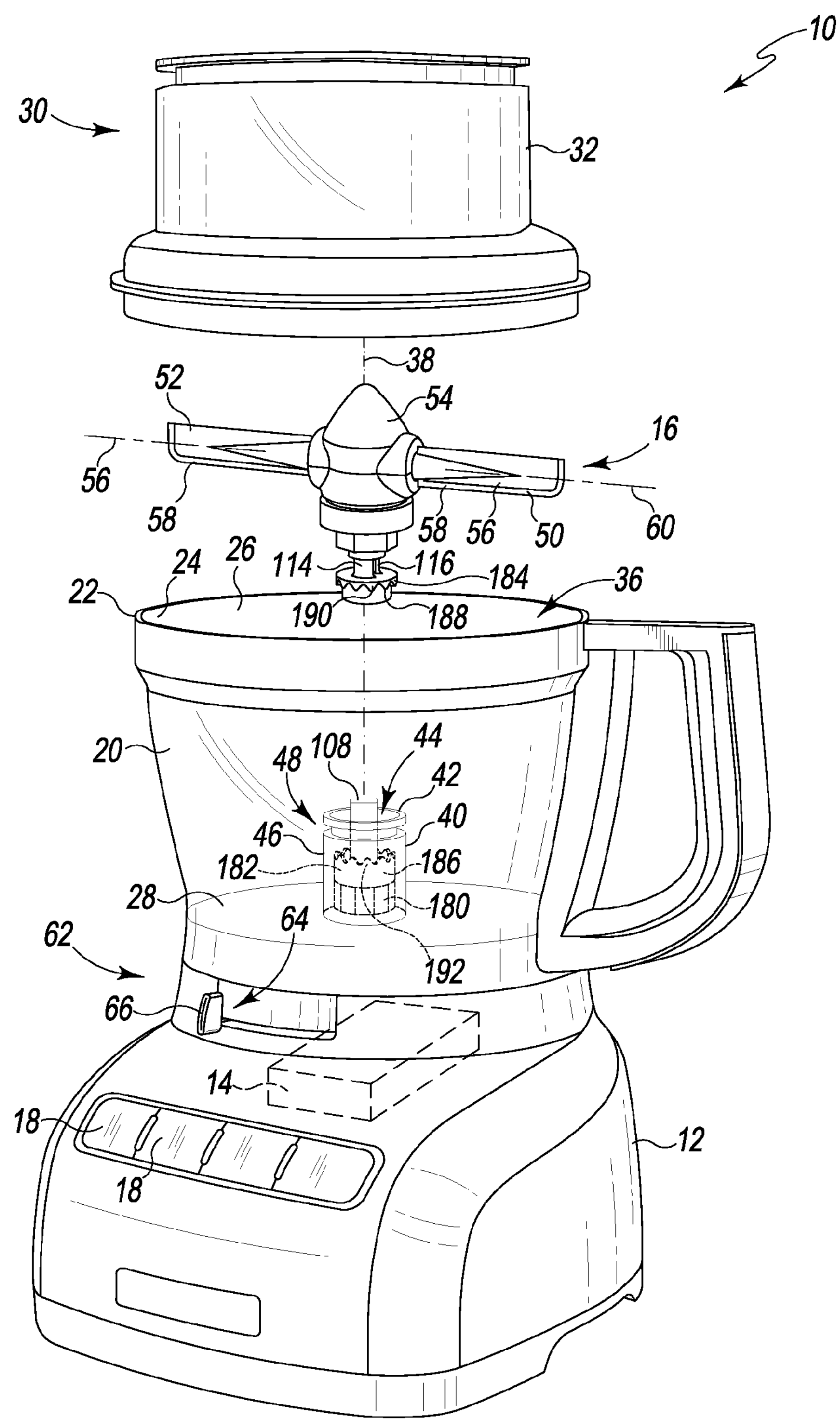
FIG. 1 is an exploded perspective view of a food processing device including a food processing tool.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure.

Referring now to FIG. 1, a food processing device or food processor 10 is shown. The food processor 10 has a base 12 that houses a motor 14 and a control unit. Under the control of the control unit, the motor 14 drives a processing tool, such as, for example, an adjustable processing tool 16 to process food items such as cheeses, meats, fruits, and vegetables. The base 12 also includes one or more buttons, switches, dials, or other types of controls 18. A user operates the controls 18 to control the operation of the motor 14 and hence the food processor 10. For example, one of the controls 18 may be operable to turn the motor 14 on and off while another control 18 may change the motor's speed.

As will be understood by those skilled in the art, the control unit may comprise analog and/or digital circuitry to process electrical signals received from the motor 14 (or other components of the food processor 10) and provide electrical control signals to the motor or other components of the food processor 10. For example, the control unit may be embodied as a microcontroller that executes firmware routines to control the operation of the food processor 10.

A removable receptacle or bowl 20 is secured to the base 12. The bowl includes a handle that facilitates placement of the bowl 20 on the base 12. The bowl 20 has an upper peripheral edge 22 that defines an opening 24. An inner wall 26 extends downwardly the opening 24 to a planar bottom wall 28. The food processor 10 also includes a removable lid 30 that may be secured to the upper peripheral edge 22 of the bowl 20. The lid 30 has a feed tube 32 formed thereon through which food items such as, for example, fruits, vegetables, and so forth are inserted into the bowl 20 to be processed by the food processor 10. Collectively, the lid 30 and the walls 26, 28 of the bowl 20 define a processing chamber 36 where food items are processed by the adjustable tool 16.

The bowl 20 has a central tube 40 that extends upwardly from the bottom wall 28 to an upper end 42. The central tube 40 has a vertically-extending passageway 44 defined therein. The central tube 40 has an outer cylindrical surface 46, and an annular slot 48 is defined in the outer surface 46 at the upper end 42 of the tube 40. As will be described in greater detail below, the adjustable tool 16 is secured to the central tube 40 during operation.

The bowl 20, the lid 30, and the feed tube 32 are generally made of a transparent or translucent plastic material so that the contents of the food processor 10 can be viewed by a user without removing the lid 30 from the bowl 20. Moreover, one or more locking mechanisms may be used to lock the bowl to the base 12 and the lid 30 to the bowl 20.

As described above, the food processor 10 also includes an adjustable processing tool 16 configured to be driven by the motor 14 to process food items. While the adjustable processing tool 16 is shown with a domestic food processor 10, it should be appreciated that in other embodiments the tool 16 may be sized and shaped for use with a mini-chopping processor or a domestic blending device. As shown in FIG. 1, the adjustable processing tool 16 of the food processor 10 includes a pair of processing blades 50, 52 that extend outwardly from a central hub 54. The central hub 54 defines a central axis 38 of the processing tool 16, which is also the axis about which the tool 16 is rotated when driven by the motor 14. Each of the blades 50, 52 includes a substantially planar body 56 having a cutting edge 58 formed thereon. In the illustrative embodiment, the substantially planar body 56 has two substantially flat side surfaces that are devoid of holes. It should be appreciated that in other embodiments the planar body 56 may be perforated with a number of through holes to aid in aeration and/or whipping.

In the illustrative embodiment, the blades 50, 52 are substantially rectangular but in other embodiments the blades 50, 52 (and hence the cutting edges 58) may be curved and may define, for example, an "S"-shaped pattern. Each of the blades 50, 52 is formed from a metallic material, such as, for example, stainless steel. It should be appreciated that in other embodiments the blades 50, 52 may be formed from a polymeric or composite material. In still other embodiments, the body 56 of each blade may be formed from a polymeric material and the cutting edge 58 may be formed from a metallic material. Additionally, in the illustrative embodiment, the processing tool 16 includes two blades. It should be appreciated that in other embodiments the processing tool 16 may include only a single blade or more than two blades.

As will be described in greater detail below, the processing blades 50, 52 are configured to pivot about an axis 60 to vary the pitch of the blades 50, 52. In the illustrative embodiment, the blades 50, 52 may be pivoted between a food stirring position (see FIG. 1) in which the blades 50, 52 extend substantially perpendicular to the bottom wall 28 of the bowl 20 and a food slicing position (see FIG. 5) in which the blades 50, 52 extend substantially parallel to the bottom wall 28 of the bowl. In the illustrative embodiment, the planar bodies 56 of the blades 50, 52 define a common plane. For example, when the blades 50, 52 are in the slicing position, the common plane is a common cutting plane. It should be appreciated that in other embodiments the blades may be staggered vertically such that one blade is positioned above or below the other blade.

The food processor 10 includes an adjustment assembly 62 that is operable by a user to adjust the pitch of the blades 50, 52 while the tool 16 is rotated by the motor 14, thereby varying the operation of the food processor 10 without stopping the motor. The adjustment assembly 62 includes a user-operated control device 64 that is located outside of the processing chamber 36. What is meant herein by the term "outside" as it relates to the location of the user-operated control device relative to the bowl or the processing chamber is that the structure of the control device contacted by the user to operate the device is positioned external to the bowl and lid so that it may be operated by the user while the lid is secured to the bowl, thereby allowing the user to adjust the operation of the food processor 10 without stopping the motor 14.

For example, in the illustrative embodiment described herein, the external control device 64 is embodied as a control lever 66 that extends outwardly from the base 12 and is moveable relative to the base 12 to change the pitch of the blades 50, 52 without removing the lid 30 from the bowl 20. In such a configuration, the user moves the control lever 66 one direction or the other to vary the pitch of the blades. An exemplary embodiment of the adjustment assembly is shown and described in PCT International Patent Application No. PCT/CN2011/000311, which was filed on Feb. 25, 2011 and is expressly incorporated herein by reference. Other exemplary embodiments of an adjustment assembly are shown and described in PCT International Patent Application No. PCT/CN2011/001487, which was filed on Sep. 1, 2011 and is expressly incorporated herein by reference. In the illustrative embodiment, the adjustment assembly is manually operated by the user-operated control device, but it should be appreciated that in other embodiments the adjustment assembly may be electrically-operated, including, for example, a motor, an electronic controller, and sensors such that the adjustment assembly may be operated automatically. It should also be appreciated that other user-operated control devices, such as knobs, dials, buttons, servo-motors, or the like, may be substituted for the control lever 66.

Figure 2:
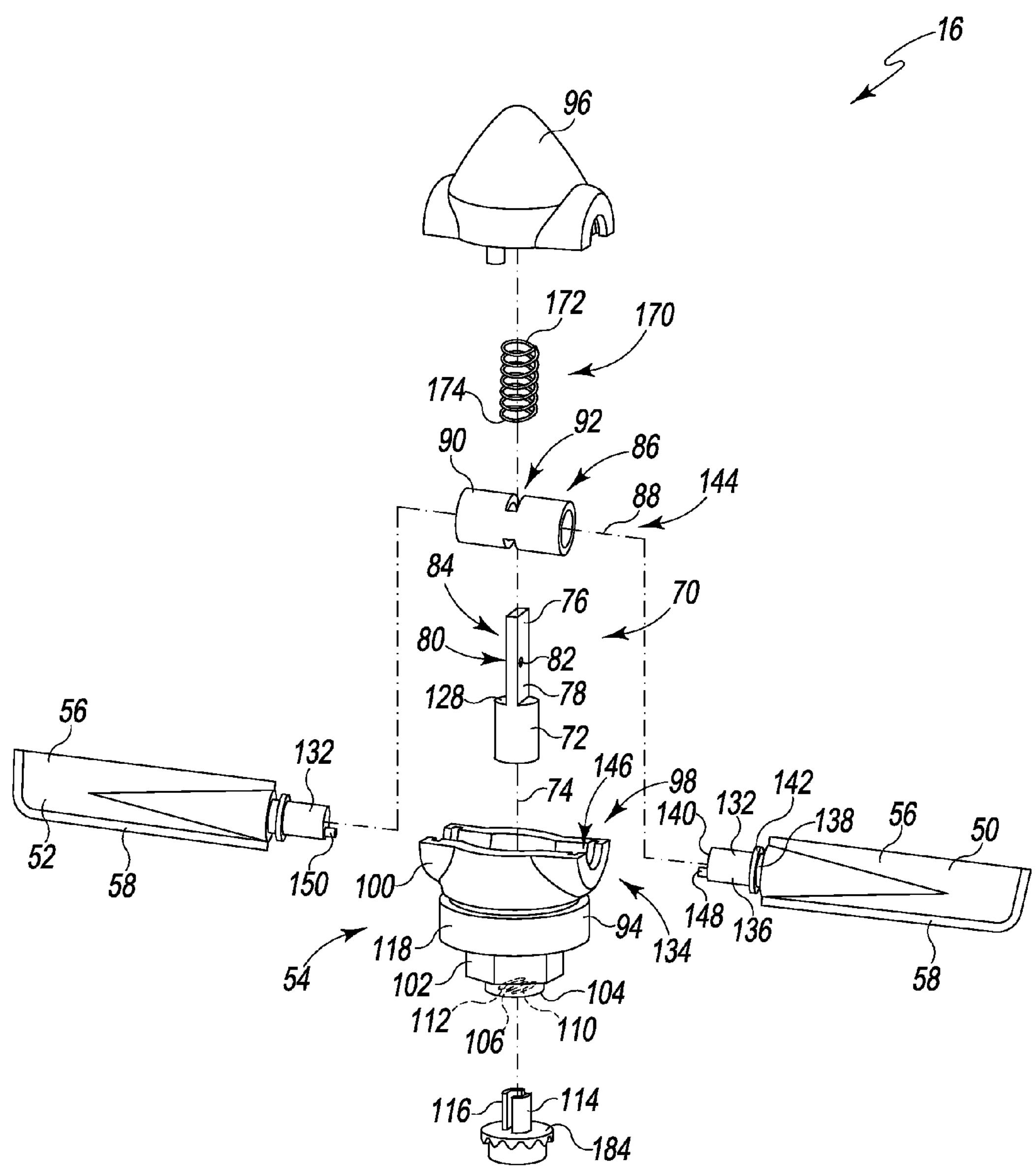
FIG. 2 is an exploded perspective view the food processing tool of FIG. 1.

As described above, the adjustable processing tool 16 includes a pair of processing blades 50, 52 that extend outwardly from a central hub 54. Referring now to FIG. 2, the blades 50, 52 are pivotally coupled to an adjuster shaft 70 positioned in the hub 54. The adjuster shaft 70 includes a cylindrical base 72 and has a longitudinal axis 74 defined by the cylindrical base 72. The adjuster shaft 70 is operable to move vertically within the hub 54 to adjust the pitch of the blades 50, 52, as described in greater detail below.

The adjuster shaft 70 also includes a beam 76 that extends upwardly from the base 72. In the illustrative embodiment, the beam 76 includes a pair of rectangular side surfaces 78, 80. It should be appreciated that in other embodiments the beam 76 may be cylindrical. The adjuster shaft 70 has a pair of bores 82, 84 that are defined in the side surfaces 78, 80, respectively, which are offset from the longitudinal axis 74 of the shaft 70.

The adjuster shaft 70 extends through a bearing 86 that is positioned in the hub 54. The bearing 86 has a longitudinal axis 88 that is coincident with the pivot axis 60 of the blades 50, 52 and extends orthogonal to the axis 74 of the adjuster shaft 70. In the illustrative embodiment, the bearing 86 has a cylindrical outer surface 90 and a slot 92 that extends through the cylindrical outer surface 90. As shown in FIG. 2, the beam 76 of the adjuster shaft 70 extends through the slot 92. In the illustrative embodiment, the adjuster shaft 70 is formed from a polymeric material, and the bearing 86 is formed from bronze. It should be appreciated that in other embodiments the shaft 70 and the bearing 86 may be formed from any metallic or polymeric material.

As shown in FIG. 2, the central hub 54 of the adjustable processing tool 16 includes a lower housing 94 and an upper housing 96 configured to be secured to the lower housing 94. The adjuster shaft 70 and the bearing 86 are positioned in a chamber 98 defined by the lower housing 94 and the upper housing 96. In the illustrative embodiment, the housings 94, 96 are formed from a metallic material such as, for example, stainless steel. It should be appreciated that in other embodiments one or both of the housings 94, 96 may be formed from a polymeric or composite material. Additionally, the housings 94, 96 may be a left housing and a right housing rather than a lower housing and an upper housing.

The lower housing 94 includes a main shell 100 and a stem 102 that extends downwardly from the shell 100 to a lower end 104. The lower end 104 of the stem 102 has a socket 106 defined therein, which is sized to receive the output shaft 108 of the motor 14, as described in greater detail below. The socket 106 is positioned between a pair of slots 110, 112 that are defined in the lower end 104. The slots 110, 112 are sized to receive a pair of pins 114, 116 of the adjustment assembly 62, as described in greater detail below.

Figure 4:
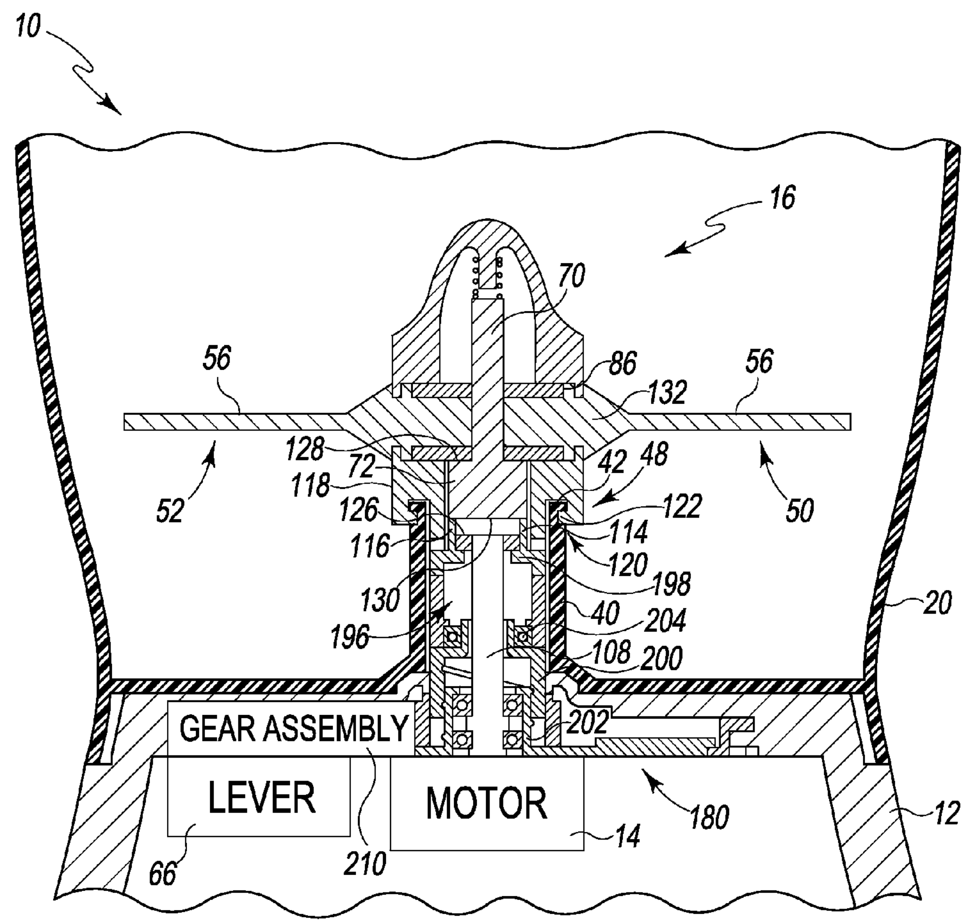
FIG. 4 is a partial cross-sectional view of the food processing device of FIG. 1 showing the food processing tool in the slicing position.

The lower housing 94 also has a collar 118 that surrounds the upper end (not shown) of the stem 102. In the illustrative embodiment, the collar 118 is formed from a polymeric material. As shown in FIG. 4, an annular slot 120 is defined between the collar 118 and the stem 102. The collar 118 has an inner ring 122 that is sized to be received in the annular slot 48 of the central tube 40 of the bowl 20. When the tool 16 is positioned on the central tube 40, the upper end 42 of the tube 40 is positioned in the annular slot 120 and the inner ring 122 of the collar 118 engages the walls defining the slot 48 to secure the tool 16 to the bowl 20. The inner ring 122 and the slot 48 of the central tube 40 are sized such that the processing tool 16 may be driven by the motor 14 when secured to the bowl 20.

As shown in FIG. 4, the base 72 of the adjuster shaft 70 is positioned in a cavity 124 defined between the bearing 86 and a bottom wall 126 of the stem 102. The adjuster shaft 70 is operable to move between a raised position in which the upper shoulder 128 of the base 72 engages the bearing 86 and a lowered position in which the bottom surface 130 of the base 72 engages the bottom wall 126 of the stem 102. In the illustrative embodiment, the vertical position of the adjuster shaft 70 corresponds to the pitch of the processing blades 50, 52, as described in greater detail below.

Each of the processing blades 50, 52 includes a planar body 56 having a cutting edge 58 that is formed thereon. The planar body 56 of each blade is attached to a support shaft 132 that extends outwardly through an opening 134 defined by the housings 94, 96 of the central hub 54. The support shafts 132 of the blade 50, 52 cooperate to define the pivot axis 60 about which the blades 50, 52 are pivoted to move between the stirring position and the slicing position described above. Each shaft 132 has a cylindrical surface 136 that extends from an end 138 attached to the planar body 56 to an end 140. A rib 142 extends outwardly from the cylindrical surface 136 between the ends 138, 140. The ends 140 of the shafts 132 are positioned in apertures 144 defined opposite ends of the bearing 86 such that the blades 50, 52 are permitted to pivot within the bearing 86. The ribs 142 of the shafts 132 are positioned in cylindrical notches 146 defined by the housings 94, 96.

Figure 3A:
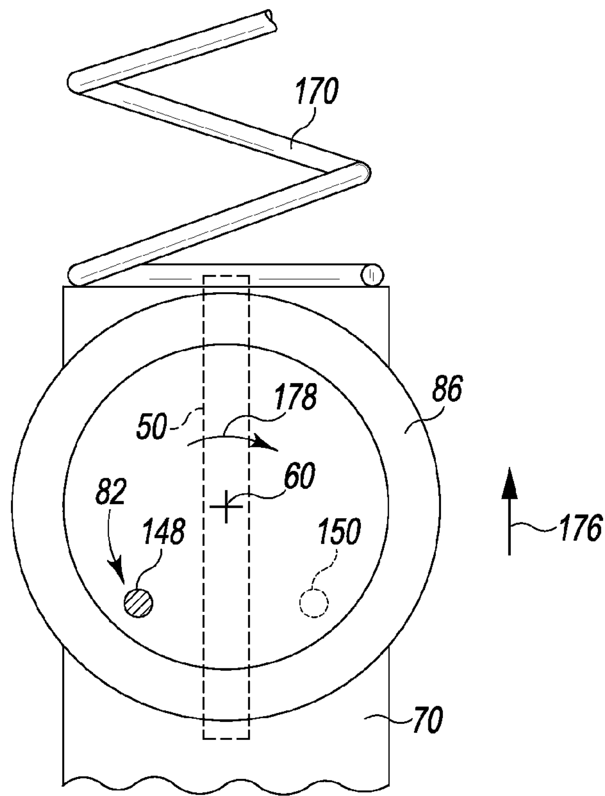
FIG. 3*a* is a cutaway side elevation view of the food processing tool in a stirring position.
Figure 3B:
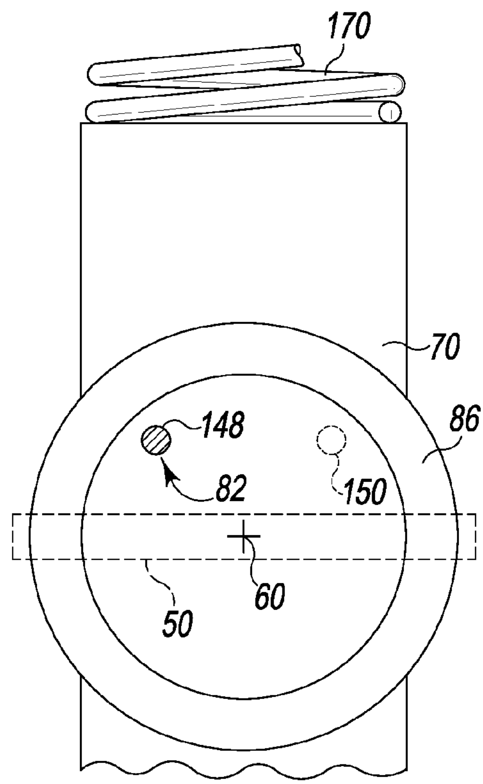
FIG. 3*b* is a cutaway side elevation view of the food processing tool in a slicing position.

The blades 50, 52 also include lugs 148, 150, respectively, that extend outwardly from the ends 138 of the blade support shafts 132. Each of the lugs 148, 150 has a longitudinal axis, respectively, that extends parallel to, but is offset from, the pivot axis 60 of the blades 50, 52. As described above, the adjuster shaft 70 has a pair of bores 82, 84 defined therein that are sized to receive the lugs 148, 150, respectively. As shown in FIGS. 3*a* and 3*b*, the lug 148 of the blade 50 is received in the bore 82 defined in the side surface 78 of the adjuster shaft 70 such that the blade 50 is coupled to the adjuster shaft 70. The lug 150 of the blade 52 is received in the other bore 84 defined in the opposite side surface 80 of the adjuster shaft 70 such that the blade 52 to the adjuster shaft 70. When the adjuster shaft 70 is moved vertically between the raised position and the lowered position, the engagement between the lugs 148, 150 and the bores 82, 84 cause the blades 50, 52 to pivot about the axis 60.

Returning to FIG. 2, the processing tool 16 of the food processor 10 also has a biasing element, such as, for example, spring 170 that is configured to bias the adjuster shaft 70 in the lowered position. In the illustrative embodiment, the spring 170 has an upper end 172 that is engaged with the upper housing 96 and a lower end 174 that is engaged with the beam 76 of the adjuster shaft 70. In that way, the spring 170 exerts a downward force on the adjuster shaft 70 to bias the adjuster shaft 70 in the lowered position.

As described above, the adjuster shaft 70 may be moved vertically between a raised position and a lower position to adjust the pitch of the blades 50, 52. As shown in FIG. 3*a*, when the adjuster shaft 70 is in the lowered position, the lug 148 of the blade 50 is positioned at approximately the seven o'clock position relative to the pivot axis 60 of the blades 50, 52. Correspondingly, the lug 150 of the blade 52 is positioned at approximately the five o'clock position relative to the pivot axis 60. When force is applied to the adjuster shaft 70 in the direction indicated by arrow 176, the bias exerted by the spring 170 is overcome, and the adjuster shaft 70 is moved upwardly. As the adjuster shaft 70 is moved upwardly, the lugs 148, 150 are advanced upwardly along with the adjuster shaft 70, thereby causing the blade 50 to pivot about the axis 60 in the direction indicated by arrow 178 between the stirring position shown in FIG. 3*a* and the slicing position shown in FIG. 3*b*. Contemporaneously, blade 52 is also pivoted about the axis 60 between the stirring position and the slicing position. When the adjuster shaft 70 is in the raised position, the lug 148 of the blade 50 is positioned at approximately the eleven o'clock position relative to the pivot axis 60 of the blades 50, 52. Correspondingly, the lug 150 of the blade 52 is positioned at approximately the one o'clock position relative to the pivot axis 60. Additionally, the spring 170 is compressed. When the upward force applied to the adjuster shaft 70 is removed, the spring 170 urges the adjuster shaft 70 to move downwardly, thereby causing the lugs 148, 150 to advance downwardly with the adjuster shaft 70 such that the blades 50, 52 move back to the stirring position.

Returning to FIG. 1, the output shaft 108 of the motor 14 extends upwardly from the center of the base 12. In the illustrative embodiment, the output shaft 108 is positioned in the passageway 44 of the central tube 40 of the bowl 20. As described above, the output shaft 108 is secured directly to the processing tool 16 via the socket 106. It should be appreciated that in other embodiments the food processor 10 may include a drive stem or other connector to couple the motor 14 to the processing tool 16. The outer geometry of the output shaft 108 is keyed to the geometry of the socket 106 such that the food processing tool 16 is torsionally locked to the output shaft 108.

As described above, the food processor 10 includes an adjustment assembly 62 that is operable to vary the pitch the blades 50, 52 of the processing tool 16. The adjustment assembly 62 includes a lift device 180 and a two-piece adaptor 182 configured to couple the processing tool 16 to the lift device 180. As shown in FIG. 1, the adaptor 182 includes an adaptor plate 184 configured to engage the processing tool 16. Specifically, the adaptor plate 184 includes the pair of pins 114, 116 that are configured to extend through the slots 110, 112, respectively, defined in the stem 102 of the tool 16. In the illustrative embodiment, the pins 114, 116 engage the bottom surface 130 of the adjuster shaft 70 when the adaptor plate 184 is assembled with the tool 16. Because the pins 114, 116 are positioned the slots 110, 112 defined in the tool 16, the adaptor plate 184 is secured to the tool 16 such that rotation of the tool 16 causes rotation of the adaptor plate 184.

The adaptor 182 also includes an adaptor sleeve 186 that is pivotally coupled to the base 12 of the food processor 10. In the illustrative embodiment, the adaptor sleeve 186 is configured to be torsionally secured to the adaptor plate 184 such that rotation of the adaptor plate 184 causes rotation of the adaptor sleeve 186. In the illustrative embodiment, a plurality of teeth 188 are formed on a lower surface 190 of the adaptor plate 184, and a corresponding plurality of teeth 192 are formed at an upper end of the adaptor sleeve 186. When the adaptor 182 is assembled, the teeth 192 of the adaptor sleeve 186 are interdigitated with the teeth 188 of the adaptor plate 184, thereby securing the plate 184 to the sleeve 186. It will be appreciated that in other embodiments a combination of pins and slots as well as other fastening means may be used to torsionally secure the plate 184 to the sleeve 186.

When the adaptor 182 and the processing tool 16 are assembled with the other components of the food processor 10, the adaptor sleeve 186 and the adaptor plate 184 are positioned in the passageway 44 defined in the central tube 40, as shown in FIG. 4. In the illustrative embodiment, the output shaft 108 of the motor 14 extends through a passageway 196 defined in the adaptor sleeve 186 and an opening 198 defined in the adaptor plate 184 between the pins 114, 116 to engage the processing tool 16.

As described above, the adjustment assembly 62 also includes a lift device 180, which is operable to move the adaptor 182 (and hence adjuster shaft 70) upwardly and downwardly. As shown in FIG. 4, the lift device 180 includes a screw-type drive assembly having an internally-threaded upper sleeve 200 engaged with an externally-threaded lower sleeve 202. The lower sleeve 202 is secured to the base 12 such that the sleeve 202 does not rotate. In use, counterclockwise rotation of the upper sleeve 200 may cause downward movement of the upper sleeve 200, while clockwise rotation of the upper sleeve 200 may cause upward movement of the upper sleeve 200.

The adaptor sleeve 186 of the adaptor 182 is rotatively coupled to the upper sleeve 200 via a bearing 204. In that way, the adaptor 182 (and hence processing tool 16) is permitted to rotate relative to the lift device 180. At the same time, the bearing 204 fixes the axial position of the adaptor sleeve 186 relative to the upper sleeve 200 such that upward and downward movement of the upper sleeve 200 causes upward and downward movement of the adaptor 182 (and hence the adjuster shaft 70).

As shown in FIG. 4, the adjustment assembly 62 also includes a gear assembly 210, which is positioned in the base 12 of the food processor 10. The gear assembly 210 includes a number of gears that are operable to rotate the upper sleeve 200 to move the upper sleeve 200 upwardly and downwardly on the lower sleeve 202. In the illustrative embodiment, the upper sleeve 200 has a plurality of grooves 212 (see FIG. 5) defined therein, and the gear assembly 210 has a corresponding plurality of splines (not shown) that are received in the grooves 212. The splines and the grooves 212 cooperate to couple the sleeve 200 to the gear assembly 210 while permitting the sleeve 200 to translate upwardly and downwardly. As such, operation of the gear assembly 210 causes rotation of the upper sleeve 200 relative to the lower sleeve 202, thereby causing movement of the upper sleeve 200 upwardly or downwardly relative to the base 12.

As described above, the adjustment assembly 62 includes a control lever 66 that extends outwardly from the base 12 of the food processor 10. In the illustrative embodiment, the control lever 66 has a grip 220 spaced apart from the base 12 and an arm 222 that extends from the grip 220 into the base 12 through a slot 224. The arm 222 is coupled to the gear assembly 210 within the base 12 such that movement of the control lever 66 along the slot 224 operates the gear assembly 210 and hence the adjustment assembly 62.

In use, a user attaches the processing tool 16 to the bowl 20 on the base 12. To do so, the opening 198 defined in the adaptor plate 184 may be aligned with the output shaft 108 of the motor 14. The adaptor plate 184 may then be advanced downward to engage its teeth 188 with the teeth 192 formed on the adaptor sleeve 186. The user may align the socket 106 defined in the processing tool 16 with the output shaft 108 of the motor 14 and the slots 110, 112 with the pins 114, 116, respectively, of the adaptor plate 184. The processing tool 16 may then be advanced downward such that the output shaft 108 is received in the socket 106 and the pins 114, 116 are received in the slots 110, 112.

To secure the processing tool 16 to the bowl 20, the user may press downward on the central hub 54 to advance the inner ring 122 of the collar 118 over the upper end 42 of the central tube 40. In that way, the inner ring 122 is snapped into the annular slot 48. It should be appreciated that in other embodiments the processing tool may include a push and release mechanism to attach and detach the tool from the bowl 20.

Figure 5:
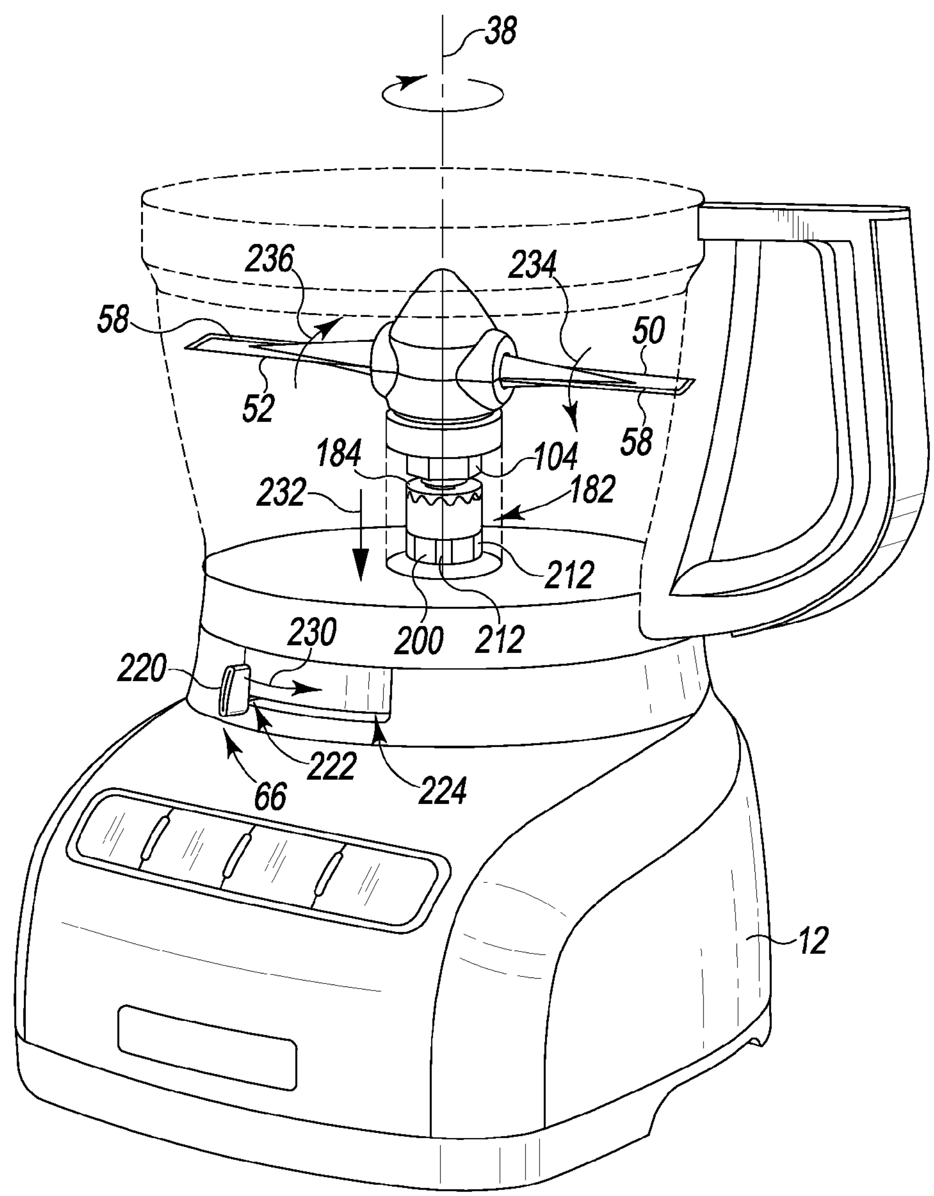
FIG. 5 is a perspective view of the food processing device of FIG. 1 showing the food processing tool in the slicing position.

While pressing downward on the central hub 54, the pins 114, 116 of the adaptor plate 184 are advanced into contact with the bottom surface 130 of the adjuster shaft 70. When the control lever 66 is positioned as shown in FIG. 5, the engagement between the adaptor plate 184 and the adjuster shaft 70 causes the adjuster shaft 70 to advance from the lowered position to the raised position such that the blades 50, 52 are pivoted between the stirring position and the slicing position when the processing tool 16 is secured to the bowl 20.

A user may operate the controls 18 to energize the motor 14 to rotate the output shaft 108. Because the processing tool 16 is secured the shaft 108, rotation of the shaft 108 causes rotation of the processing tool 16. While the motor 14 is energized, the user may advance food items into the processing chamber 36 through the feed tube 32 to be cut by cutting edges 58 of the blades 50, 52 of the processing tool 16.

If the user desires to convert the processing tool 16 from a cutting tool to a stirring tool without stopping the motor 14, the user may grasp the grip 220 and advance the control lever 66 along the slot 224 in the direction indicated by arrow 230. Movement of the control lever 66 operates the gear assembly 210 to rotate the upper sleeve 200 and move the upper sleeve 200 downwardly in the direction indicated by arrow 232, toward the base 12. As the upper sleeve 200 is moved downward, the adaptor 182 is also moved downward, thereby causing the adaptor plate 184 to move away from the lower end 104 of the processing tool 16, which is in a fixed vertical position on the central tube 40. As a result, the pins 114, 116 move downward with the adaptor plate 184, and the adjuster shaft 70 is urged downward by the spring 170, thereby pivoting the blades 50, 52 in the direction indicated by arrows 234, 236, respectively, between the slicing position shown in FIG. 5 and the stirring position shown in FIG. 6.

Figure 6:
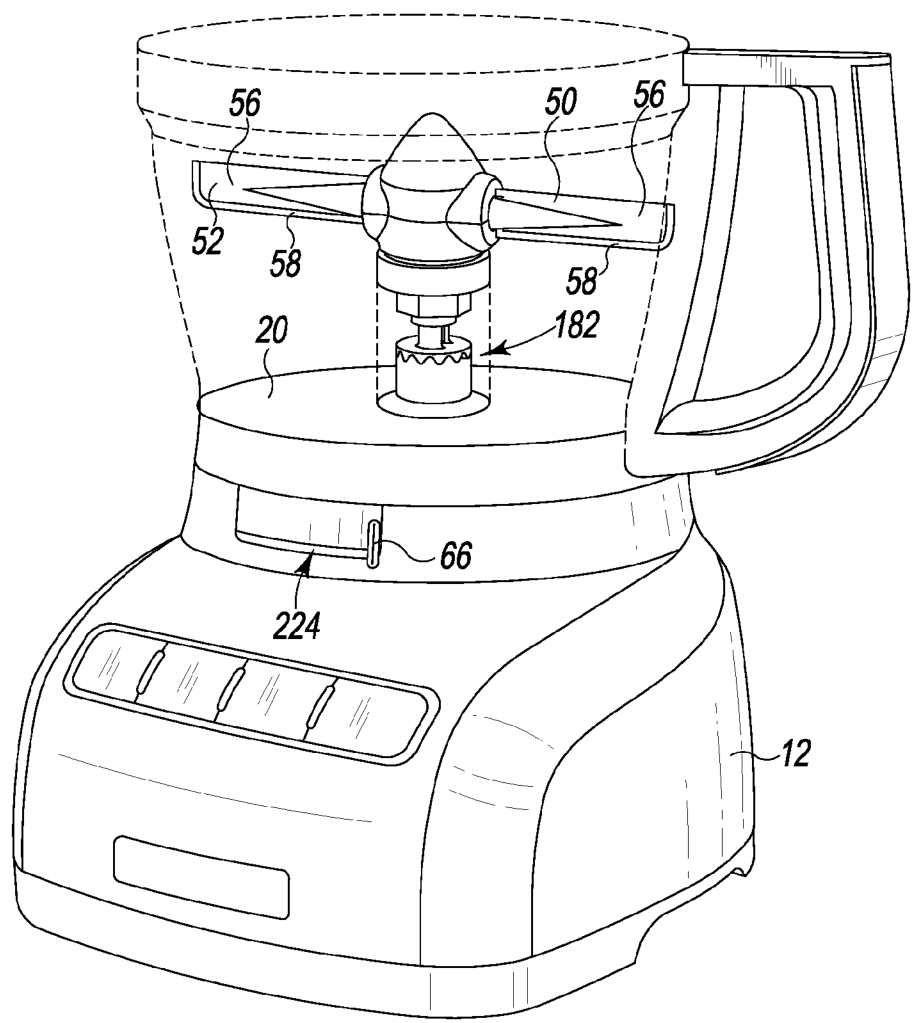
FIG. 6 is a perspective view of the food processing device of FIG. 1 showing the food processing tool in the stirring position.

As shown in FIG. 6, the cutting edges 58 of the blades 50, 52 extend downwardly when the blades 50, 52 are in the stirring position and the blade bodies 56 are positioned substantially orthogonal to the bottom wall 28 of the bowl 20. While the motor 14 is energized, the blade bodies 56 may function as paddles or mixing elements to mix and stir the food items positioned in the processing chamber 36. If the user desires to perform further cutting, the user may move the control lever 66 in the opposite direction along the slot 224 to change the pitch of the blades 50, 52.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

For example, the adjustment assembly may include other electromechanical components such that the user may adjust the operation of the processing tool at the touch of a button while the processing tool 16 is driven by the motor 14. The electromechanical components may include, for example, a small motor that would directly operate a screw-type drive assembly without a gear assembly while the other motor drives the cutting assembly. The electromechanical components may also include control circuitry to process electrical signals received from the second motor and provide electrical control signals to the second motor. For example, the control circuitry may be embodied as a microcontroller that executes firmware routines to control the operation the second motor to adjust the pitch of the blades.

Additional controls or buttons to control the operation of the second motor may be added to the food processor based on, for example, the food load or recipe status. For example, the control circuitry may include firmware routines that control the operation of the food processor by monitoring the change in forces and/or the rotational speed of the food processing tool 16. The control circuitry may be configured to adjust torque, speed, or blade pitch in response to those measurements.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure.

The invention claimed is:

1. A food processing device comprising:

a base having a motor positioned therein, a removable bowl coupled to the base, a removable lid coupled to the bowl so as to define a processing chamber, the lid having a feed tube that opens into the bowl, a food processing tool positioned in the processing chamber and driven by the motor to rotate about a central axis, the food processing tool including a hub defining the central axis and a pair of adjustable blades extending outwardly from the hub, each adjustable blade having a cutting edge formed thereon, and an adjustment assembly including a lever extending outwardly from the base, the lever being moveable relative to the base and operable to pivot each adjustable blade while the food processing tool is rotated about the central axis between a plurality of positions including (i) a first position in which each adjustable blade extends substantially parallel to a bottom surface of the removable bowl, and (ii) a second position in which each adjustable blade extends substantially orthogonal to the bottom surface of the removable bowl.

2. The food processing device of claim 1, wherein the food processing tool includes a shaft that is positioned in the hub and is coupled to the adjustable blades, the shaft being movable vertically relative to the hub between (i) a raised position in which the adjustable blades are in the first position and (ii) a lowered position in which the adjustable blades are in the second position.

3. The food processing device of claim 2, wherein the adjustment assembly further includes an adaptor having an upper end coupled to the shaft of the food processing tool and a lower end coupled to the base, wherein movement of the lever relative to the base causes vertical movement of the adaptor and the shaft of the food processing tool.

4. The food processing device of claim 3, wherein the adaptor includes an upper plate coupled to the food processing tool and a lower sleeve pivotally coupled to the base.

5. The food processing device of claim 4, wherein the upper plate includes a first plurality of teeth, and the lower sleeve has a second plurality of teeth formed thereon, the second plurality of teeth being interdigitated with the first plurality of teeth.

6. The food processing device of claim 4, wherein:

movement of the lever in a first direction relative to the base causes (i) the adaptor to move downward and (ii) the shaft to move from the raised position to the lowered position, and movement of the lever in a second direction opposite the first direction causes (i) the adaptor to move upward and (ii) the shaft to move from the lowered position to the raised position.

7. The food processing device of claim 2, wherein the shaft is biased in the lowered position.

8. The food processing device of claim 2, wherein the hub of the food processing tool is in a fixed vertical position relative to the base.

9. The food processing device of claim 8, wherein:

the removable bowl has a central tube extending upwardly from the bottom surface, and the hub of the food processing tool is coupled to an upper end of the central tube.

10. A food processing device comprising:

a base having a motor positioned therein, a removable bowl coupled to the base, a removable lid coupled to the bowl so as to define a processing chamber, the lid having a feed tube that opens into the bowl, a food processing tool positioned in the processing chamber and driven by the motor to rotate about a central axis, the food processing tool including a hub defining the central axis and at least one adjustable blade extending outwardly from the hub, the adjustable blade being configured to rotate about a pivot axis extending through the hub orthogonal to the central axis, and an adjustment assembly operable to cause the adjustable blade to rotate about the pivot axis while the food processing tool is driven by the motor.

11. The food processing device of claim 10, wherein the adjustment assembly includes an adaptor having an upper end coupled to the food processing tool and a lower end coupled to the base.

12. The food processing device of claim 11, wherein:

the removable bowl has a central tube extending upwardly from a bottom surface thereof, the adaptor is positioned in the central tube of the bowl, and the hub of the food processing tool is coupled to an upper end of the central tube.

13. The food processing device of claim 12, wherein the adjustable blade is configured to rotate between:

a first position in which a cutting edge of the adjustable blade extends substantially horizontally, and a second position in which the cutting edge extends substantially vertically.

14. A food processing tool for a domestic food processing device, comprising:

a hub including a socket sized to receive an output shaft of the food processing device, the hub defining a central rotation axis of the food processing tool, a shaft movably coupled to the hub, the shaft being configured to move vertically along the central rotation axis, and a pair of adjustable blades extending outwardly from the hub, each blade having a cutting edge formed thereon, wherein each adjustable blade is pivotally coupled to the shaft such that vertical movement of the shaft causes the adjustable blades to pivot about an axis extending orthogonal to the central rotation axis.

15. The food processing tool of claim 14, further comprising an adaptor having an upper end coupled to the shaft and a lower end having a plurality of teeth formed thereon.

16. The food processing tool of claim 14, wherein each adjustable blade is configured to pivot between (i) a first position in which the cutting edge extends horizontally, and (ii) a second position in which the cutting edge extends vertically.

17. The food processing tool of claim 16, wherein the adjustable blades are biased in the second position.

18. The food processing tool of claim 14, wherein each adjustable blade includes:

a cylindrical base that defines the axis, and a pin extending outwardly from the cylindrical base, the pin being offset from the axis and received in an opening defined in the shaft.

19. The food processing tool of claim 18, further comprising a hollow tube secured to the hub, wherein the cylindrical bases of the adjustable blades are positioned at opposite ends of the hollow tube, and an upper end of the shaft extends through a slot defined in the hollow tube.

20. The food processing tool of claim 19, further comprising a spring positioned between the upper end of the shaft and an inner wall of the hub.

* * * * *